(12) United States Patent
Sheldon

(10) Patent No.: US 7,171,111 B2
(45) Date of Patent: Jan. 30, 2007

(54) METHOD OF HEATING WATER WITH ROD SHAPED ELECTRODES IN A TWO-DIMENSIONAL MATRIX

(76) Inventor: Carlton W. Sheldon, 459 Sandy Birch Rd., Milton, VT (US) 05468

( * ) Notice: Subject to any disclaimer, the term of this patent is extended or adjusted under 35 U.S.C. 154(b) by 44 days.

(21) Appl. No.: 10/328,901

(22) Filed: Dec. 24, 2002

(65) Prior Publication Data

US 2004/0004005 A1    Jan. 8, 2004

Related U.S. Application Data

(60) Provisional application No. 60/394,161, filed on Jul. 3, 2002, provisional application No. 60/412,634, filed on Sep. 20, 2002.

(51) Int. Cl.
*F24H 1/00* (2006.01)

(52) U.S. Cl. .................. 392/312; 392/314; 392/338

(58) Field of Classification Search ............... 392/311, 392/312, 314, 320, 324, 331, 338
See application file for complete search history.

(56) References Cited

U.S. PATENT DOCUMENTS

| | | | | |
|---|---|---|---|---|
| 938,127 A | * | 10/1909 | Denhard | 392/320 |
| 1,103,274 A | * | 7/1914 | Denhard | 392/314 |
| 1,219,265 A | * | 3/1917 | Denhard | 392/314 |
| 1,362,356 A | * | 12/1920 | Schneider | 392/318 |
| 1,431,580 A | * | 10/1922 | Graetzer et al. | 392/314 |
| 3,664,929 A | * | 5/1972 | White et al. | 203/10 |
| 4,379,043 A | * | 4/1983 | Chappelle | 204/228.5 |
| 5,293,447 A | * | 3/1994 | Fanney et al. | 392/449 |
| 6,421,501 B2 | * | 7/2002 | Berthou et al. | 392/314 |

FOREIGN PATENT DOCUMENTS

| | | | |
|---|---|---|---|
| DE | 10123945 | * | 11/2002 |
| GB | 283544 | * | 5/1929 |

* cited by examiner

*Primary Examiner*—John A. Jeffery
(74) *Attorney, Agent, or Firm*—O'Shea, Getz & Kosakowski, P.C.

(57) ABSTRACT

An improved scheme for dissociating water into hydrogen and oxygen is provided in which a two dimensional matrix of electrodes is provided in a reaction vessel. The electrodes are connected to a source of electrical power for providing a potential difference there between sufficient for dissociating the water. The matrix includes a smallest two dimensional repeating group that consists of four electrodes arranged in a quadrilateral clockwise plus, minus, plus, minus. The hydrogen can be used for burning, running an internal combustion engine, or for providing electrical power in a fuel cell. Core water from the matrix can also be used directly as heating water. Direct current, or switched direct current can be used for generating hydrogen while AC sources can be used for generating heat.

21 Claims, 4 Drawing Sheets

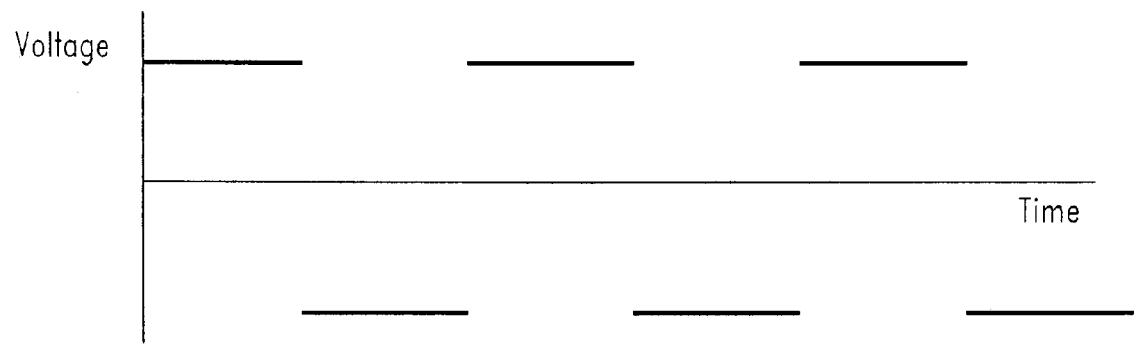
FIG. 4a
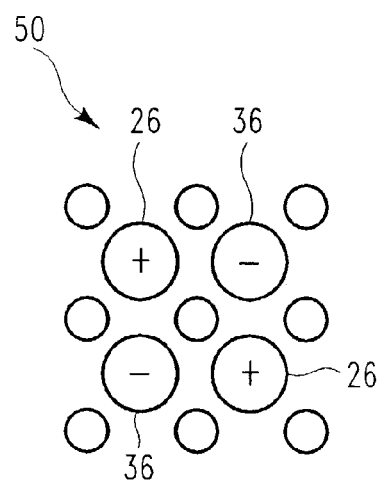 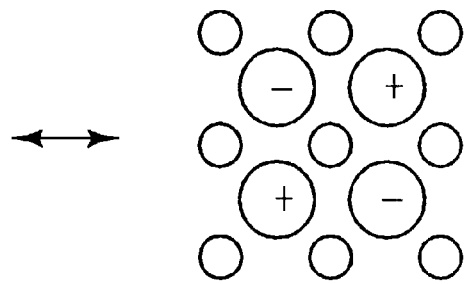
FIG. 4b                    FIG. 4c

US 7,171,111 B2

METHOD OF HEATING WATER WITH ROD SHAPED ELECTRODES IN A TWO-DIMENSIONAL MATRIX

RELATED APPLICATIONS

This application claims priority of provisional applications 60/394,161 filed Jul. 3, 2002 and 60/412,634, dated Sep. 20, 20002, and incorporated herein by reference.

FIELD OF THE INVENTION

This invention generally relates to a device for dissociating water to obtain hydrogen or for heating the water. More particularly, it relates to an arrangement of electrodes to provide efficient evolution of hydrogen and oxygen or heating.

BACKGROUND OF THE INVENTION

Dissociating water into hydrogen and oxygen gas involves providing a sufficient potential difference between electrodes to break H—O bonds. As described in U.S. Pat. No. 5,997,283, ("the '283 patent") the amount of gas produced depends on the type and concentration of the electrolytic solution used, the anode/cathode electrode pair surface area, the electrolytic resistance, the achievable current density, and the anode/cathode potential difference. The '283 patent further notes the difficulty of producing high gas flow rates on demand from prior art electrolysis apparatus and even then the equipment suffers from low efficiencies in the conversion of electrical energy to generate the hydrogen and oxygen gases.

U.S. Pat. No. 4,379,043 also notes that prior art apparatus for producing hydrogen and oxygen via the electrolysis of water are inefficient. Thus, a better system for dissociating water is needed to provide a way to more efficiently obtain hydrogen and oxygen, and this solution is provided by the following invention.

SUMMARY OF THE INVENTION

It is therefore an object of the present invention to provide an arrangement of electrodes that efficiently dissociates water into hydrogen and oxygen;

It is a further object of the present invention to provide an arrangement of electrodes that efficiently heats water;

It is a feature of the present invention that distance between an electrode of the matrix and its nearest common electrode neighbor is greater than distance between that electrode and its nearest opposite electrode neighbor;

It is an advantage of the present invention that hydrogen is efficiently produced; and It is a further advantage of the present invention that water is efficiently heated.

These and other objects, features, and advantages of the invention are accomplished by a device that includes a reaction vessel containing at least one sub-unit comprising four rod-shaped electrodes. The four rod shaped electrodes include two first electrodes and two second electrodes. The four rod-shaped electrodes are arranged clockwise first electrode, second electrode, first electrode, second electrode, and they are each located at a vertex of a quadrilateral. The first electrodes and the second electrodes are for connection to a source of electrical power for providing a potential difference between the two first electrodes and the two second electrodes.

Another aspect of the invention is a device that includes a reaction vessel containing a first electrode and a second electrode for connection to a power supply to provide a potential difference there between. The first electrode includes a first two-dimensional matrix of first rods. The second electrode includes a second two-dimensional matrix of second rods. The second matrix is positioned with respect to the first matrix so a single second rod of the second matrix is located between adjacent first rods of the first matrix along both dimensions of the first two-dimensional matrix.

Another aspect of the invention is a device that includes a top plate, a bottom plate, first rod-shaped electrodes and second rod-shaped electrodes. The first electrodes extend from the top plate toward the bottom plate in a first two-dimensional matrix. The second electrodes extend from the bottom plate toward the top plate in a second two-dimensional matrix. The first electrodes alternate with the second electrodes in a combined two-dimensional matrix along each of the two dimensions of the combined two-dimensional matrix.

Another aspect of the invention is a method of dissociating or heating water that includes the step of providing a reaction vessel having water therein and providing a two dimensional matrix of rod shaped electrodes in the water in the reaction vessel. The matrix of rod shaped electrodes includes first electrodes and second electrodes. The matrix includes a smallest two dimensional repeating group that consists of four electrodes arranged clockwise in order: first electrode, second electrode, first electrode, second electrode. A power supply is connected to provide a potential difference between the first electrodes and the second electrodes.

BRIEF DESCRIPTION OF THE DRAWINGS

The foregoing and other objects, features, and advantages of the invention will be apparent from the following detailed description of the invention, as illustrated in the accompanying drawings, in which:

FIG. 4a is a timing diagram for the switched DC source of power of FIG. 3.

FIGS. 4b, 4c are schematic diagrams showing the smallest unit cell of the matrix and also showing how polarity switching is provided across neighboring electrodes of the matrix by a switched DC supply or an AC supply

DETAILED DESCRIPTION OF THE INVENTION

The present inventor recognized that an improved arrangement of electrodes would more efficiently dissociate water into hydrogen and oxygen. In one embodiment, a matrix of electrodes are arranged in a square repeating pattern in which alternate pairs of commonly connected electrodes are along each diagonal of the square. In other words, going around the square clockwise, the electrodes are arranged plus, minus, plus, minus. The arrangement also provides for efficiently heating water.

Figure 1A:
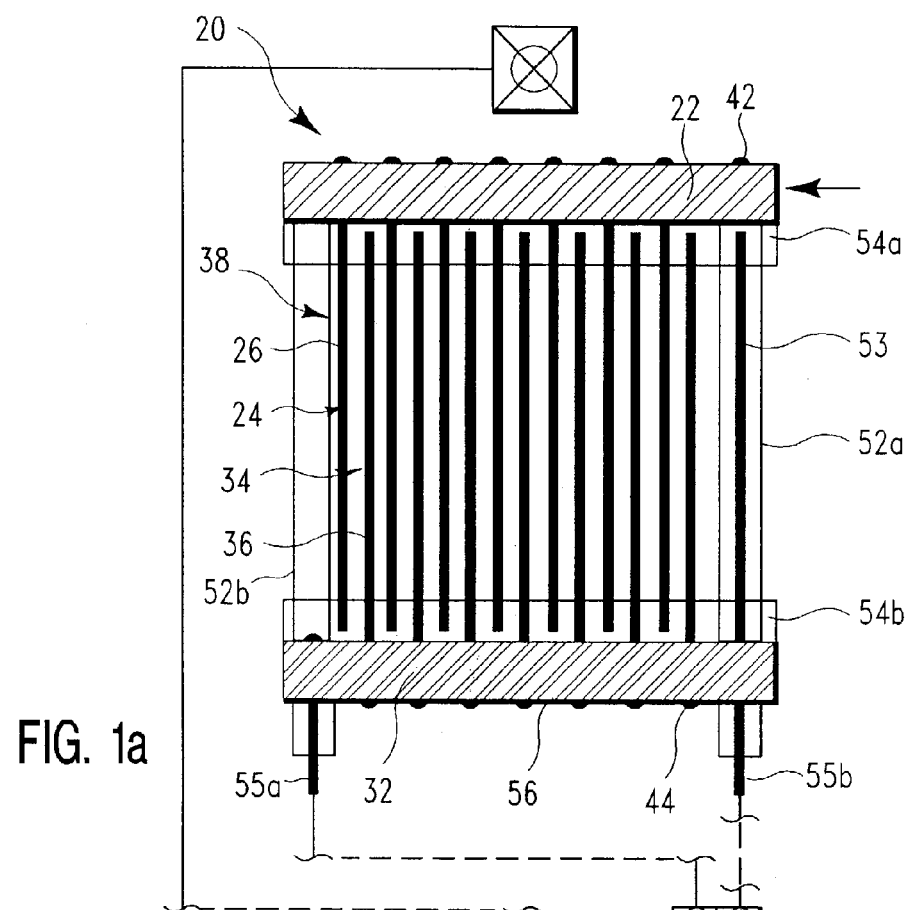
FIG. 1a is a cross sectional view of a core of the present invention showing top and bottom electrode disks and a matrix of electrodes extending from each.
Figure 1B:
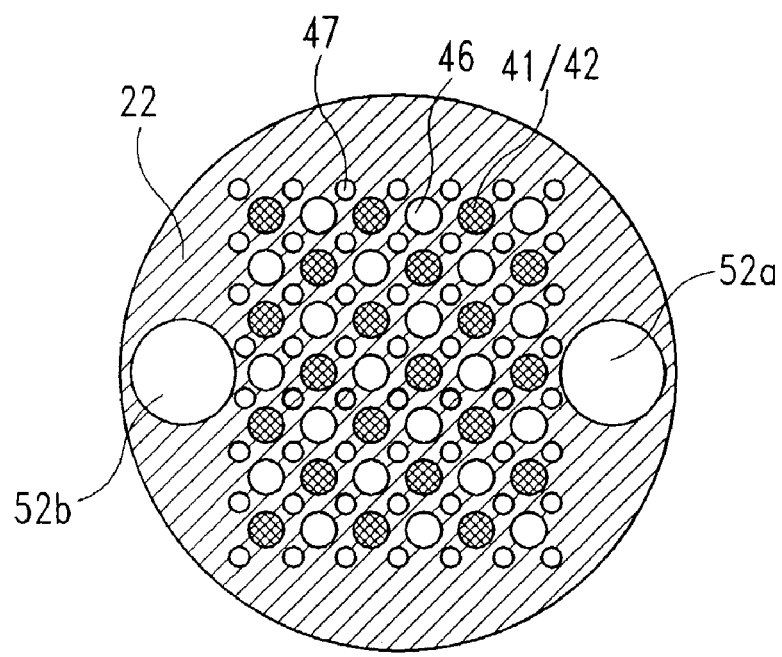
FIG. 1b is a cross sectional view through a plane perpendicular to FIG 1a adjacent the top electrode disk.
Figure 1C:
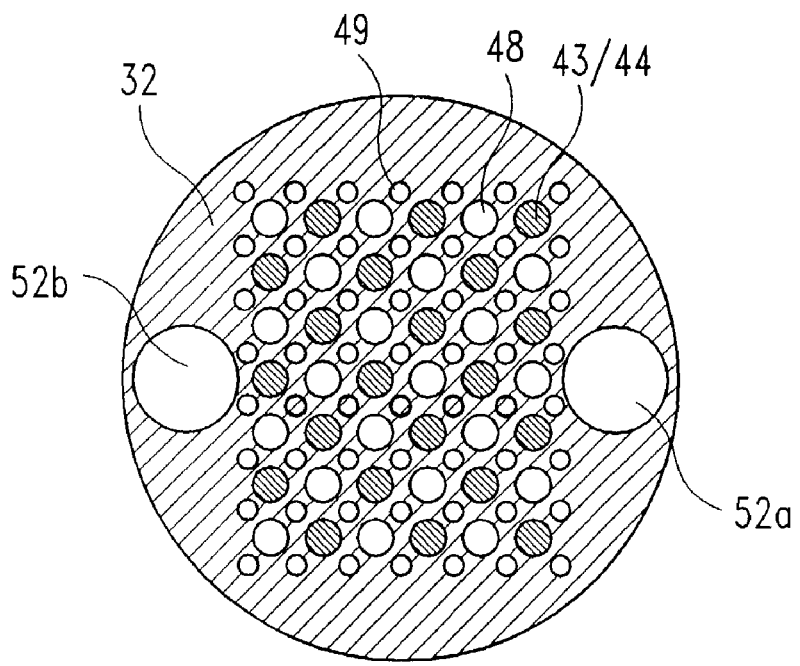
FIG. 1c is another cross sectional view through a plane perpendicular to FIG. 1a adjacent the bottom electrode disk.

Core 20 includes top electrode disk 22 to which top two-dimensional matrix 24 of rods 26 is physically and electrically connected, as shown in FIGS. 1*a*–1*c*. Core 20 also includes bottom electrode disk 32 which is similarly attached to bottom two-dimensional matrix 34 of rods 36, positioned so rods 26 and rods 36 alternate along each row and column of overall two-dimensional matrix 38 formed by matrices 24 and 34.

Figure 3:
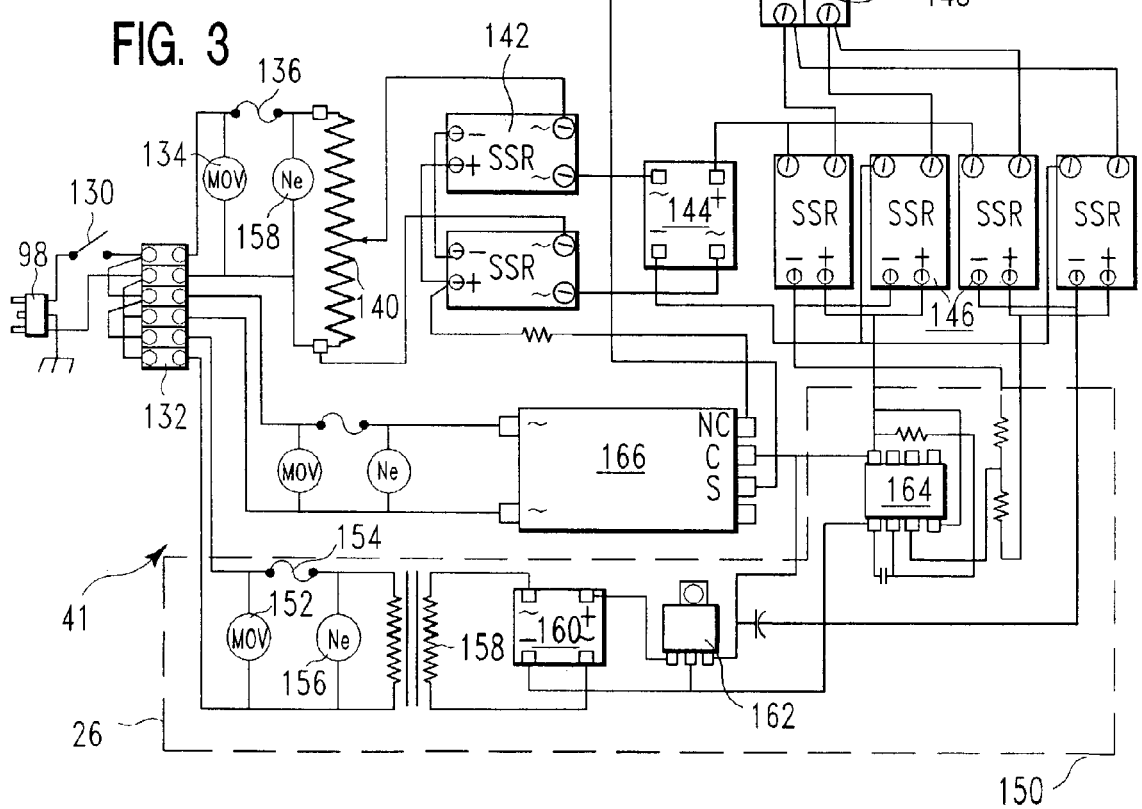
FIG. 3 is a circuit diagram of a switched DC source of power for dissociating water.

Core 20 is immersed in water 39, which also includes an electrolyte such as potassium hydroxide, in reaction vessel 40, as shown in FIG. 3. A potential difference is provided by source 41 of electrical power between electrode disk 22 and electrode disk 32, and through them between rods 26 and rods 36 of matrices 24 and 34 sufficient to dissociate water 39 (see FIG. 2) flowing in spaces between rods 26, 36 of overall matrix 38 into hydrogen and oxygen. The present inventor found that this two-dimensional matrix arrangement of electrodes facilitates breaking of the chemical bonds holding water molecules together and provides a more efficient dissociation of water.

Electrode disks 22, 32, and rods 26, 36 are fabricated of a conductive material, such as stainless steel, nickel, titanium, or copper.

In one embodiment cylindrical electrode disks 22, 32 are about 2 inches in diameter and 0.25 inch thick. Cylindrical rods 26 penetrate through holes 41 in electrode disk 22 and are welded in place with welds 42, as shown in FIG. 1*a*. Similarly, rods 36 penetrate through holes 43 in electrode disk 32 and are welded in place with welds 44. Rods 26, 36 have a diameter of 0.125 inches and are about 4 inches long in this embodiment.

Additional holes 46, 47 are provided in top electrode disk 22, and additional holes 48, 49 are provided in bottom electrode disk 32 to allow water 39 to flow through each electrode disk. Holes 46, 48 have a diameter about equal to that of the rods, 0.125 inches while holes 47, 49 have a smaller diameter of about 0.0625 inches. Smaller holes 47, 49 are located in spaces between rods 26, 36 along a diagonal, as shown in FIG. 1*b*, 1*c*. Rods 26, 36 are spaced 0.0625 inches from each other in this embodiment, as shown in FIG. 1*d*.

Thus, in this embodiment, smallest unit cell 50 (see FIG. 4*b*) of overall matrix 38 has two rods 26 of matrix 24 and two rods 36 of matrix 34. The rods are arranged in a square pattern with rods of each matrix, or like-rods, located at diagonally opposite vertices of the square, as shown in FIG. 4*b*. When a potential difference is applied to disks 22, 32 and hence to matrices 24, 34, going around the square in either direction, rods alternate in polarity, as shown in FIG. 4*b*, while diagonally opposed rods have the same potential.

Structural support for core 20 is provided by plastic support rods 52*a*, 52*b* fabricated of an insulating material such as Polyetheretherketone or "peek" plastic, which is widely available, which has good mechanical strength at elevated temperature, up to 480° F., is a good electrical insulator, has high resistance to chemical reaction, and has low thermal expansivity. Preferably top electrode disk 22 is connected for external electrical connection through bottom electrode disk 32 with extended power feed rod 53 that is insulated from electrode disk 32 so both electrode disks can be electrically contacted from below bottom electrode disk 32, facilitating escape of hydrogen through holes 46, 47 of top electrode disk 22. Extended power feed rod 53 extends through a hole bored along the axis of plastic support rod 52*a* while solid rod 52*b* just provides support. Electrode disks 22, 32 are separated from water 39 by plastic disks 54*a* and 54*b*, also fabricated of the peek plastic material.

Figure 2:
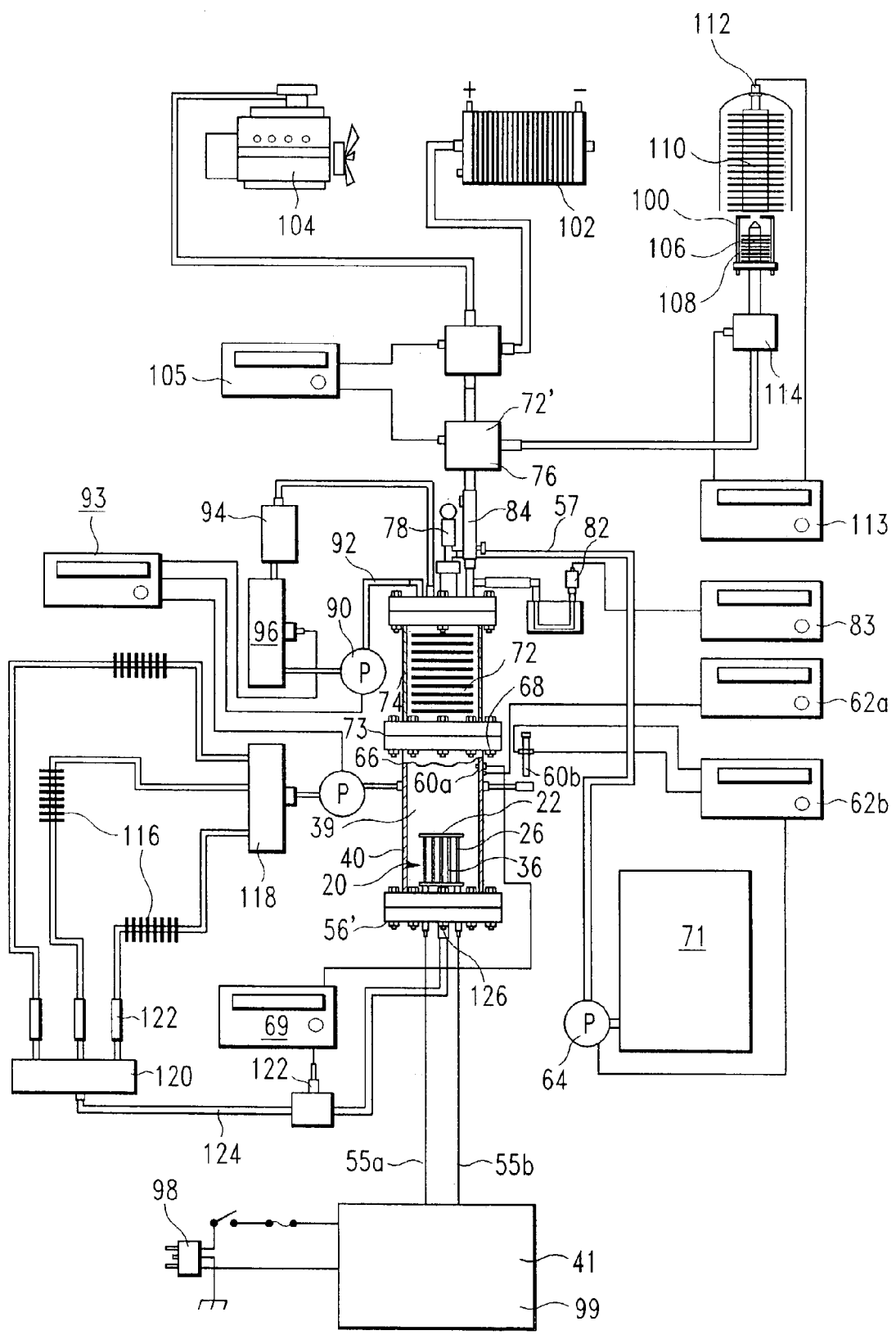
FIG. 2 is a cross sectional view of the core of FIG. 1a in a tank with external connections and other arrangements for delivering hydrogen.

Contact 55*a* extends from bottom wall 56 of reaction vessel 40 while contact 55*b* extends through bottom wall 56 for external connection to source 41 of electrical power, as shown in FIG. 2. Water 39 enters reaction vessel 40 through pipe 57 to replace water dissociated into hydrogen and oxygen.

Core 20, is completely submerged under water 39 within reaction vessel 40, and no parts of top electrode disk 22 or electrodes 26, 36 are exposed to hydrogen or oxygen above the level of the water, increasing efficiency and safety.

Water level sensors 60*a*, 60*b* are connected to controller 62*a*, 62*b* and feed water pump 64 to sense presence of water 39 and maintain water level 66 within reaction vessel 40 above a pre-determined low water level and below a pre-determined high water level set by positions of water level sensors 60*a*, 60*b*. Water level sensors 60*a*, 60*b* can be optical (60*b*) or electrical (60*a*). Other sensors, such temperature sensor 68, can be used for other measurements within reaction vessel 40, and controller 69 can be used to provide control based on those measurements. For example, conductivity sensor 60*a* can be used to measure and provide feedback to control concentration of electrolyte within water 39 in reaction vessel 40. Additional water can be supplied, as needed, from water tank 71 by means of pump 64 and pipe 57.

Mixed hydrogen and oxygen gas 72, along with some water vapor, emerge from electrolyzed water 39 at each of the electrodes 26, 36 in overall matrix 38. Mixed hydrogen and oxygen gas 72 then passes through top electrode disk 22 and through top wall 73 of reaction vessel 40. The gases then pass through condenser coils 74 to condense out any water vapor. Dry hydrogen and oxygen gases 72' are then available for use at valve 76 atop condenser coils 74. Pressure relief valve 78, and pressure gauge 82 are also provided there. Pressure from pressure gauge 82 is read out at monitor 83. Push back arrester 84 is provided at valve 76 to prevent flash back.

Pump 90 circulates cooling fluid 92, such as ethylene glycol, in condenser coils 74. Pump 90 is controlled by controller 93. Cooling fluid tank 94 supplies the cooling fluid, and heat exchanger and fan 96 dissipate the heat absorbed in condenser coils 74.

Source 41 of electrical power can be a dc power supply, a switching dc power supply, or an ac power supply. Power can be provided from standard electrical power sources or from sun light, such as from phototovoltaic cells.

In one embodiment power supply source 41 is a switching power supply which provides power to each of the electrodes alternating in polarity slowly over time, as shown in FIG. 4*a*. A typical frequency of switching is about 2 Hz but the frequency can range from 0.1 Hz to 60 Hz. Switching helps avoid contaminant buildup on electrodes, which can reduce efficiency of generation of hydrogen and oxygen.

In another embodiment standard 60 cycle AC power at 120 V from plug 98 is used through a variac transformer 99. In one experiment a core having a total of 42 rods, half of each polarity, were used. 25 amps at 30.2 volts AC or 755 Watt s was provided to the electrodes and circulating water was heated. In this embodiment condensor 74 and other apparatus for using or handling hydrogen is not needed.

The mixture of hydrogen and oxygen gases 72 formed by dissociation in reaction vessel 40 can be used immediately as an oxygenated fuel in burner 100 for providing a very high temperature flame. The gases can also be used to generate electricity in fuel cell 102, or to run internal combustion engine 104. Hydrogen and oxygen gas mixture 72 can also be stored for later use. Value controller 105 can be provided to switch gas flow for multiple uses.

For direct burning in burner 100, preferably nozzle 106 is cooled with air flowing across copper heat sink 108 to prevent damage to nozzle 106 from the high temperature flame. The high temperature flame provided by burning hydrogen has many uses, from welding to heating water. For example burner 100 can be used to heat water circulating in heat exchanger 110. The heated water can be stored in a hot water holding tank (not shown). Thermal sensor 112 is located to sense whether the flame is lit in burner 100, and thermal sensor 112 provides input to controller 113 that controls auto shut-off valve 114.

Water 39 in reaction vessel 40, which particularly heats up during AC operation of the device, can be circulated outside reaction vessel 40 to provide heat externally, such as in heat exchangers 116, and cooler water is then provided back to reaction vessel 40. Output manifold 118 and return manifold 120 control which of the heat exchangers 116 receives the flow of heated water 39 from reaction vessel 40. Check valves 122 ensure that water flows in the desired direction. Return temperature sensor 122 is connected to temperature controller 69 to provide return water temperature as it flows through pipe 124 back into inlet port 126 on reaction vessel 40.

An electrolyte, such as potassium hydroxide, with a density range from about 0.05 mg/ml to 5 mg/ml is used in water 39. Density is substantially less than the 23% to 30%, commonly used for dissociation. Preferably for AC operation the density range is in the range from about 0.05 mg/ml to 0.25 mg/ml and for DC operation the density range is in the range from about 1 mg/ml to 5 mg/ml.

The present inventor found that the arrangement of a matrix of narrow rod shaped electrodes provides a larger number of electrodes and a larger electrode surface area compared to previous systems, increasing the efficiency of the process. The present inventor also found that slowly reversing the polarity of the applied potential difference also increases efficiency of the dissociation reaction. He believes that the reversing potential prevents contamination from plating out on electrodes.

Switching power supply 41 provides polarity switching for DC power. Input AC is provided by plug 98 to switch 130 and in input power terminal block 132. Power spikes in the input supply are accommodated with metal oxide varistor 134. Fuse 136 and neon power indicator lamp 138 feed to variable power transformer 140 which controls voltage level. Solid state relays 142 provide ac power to rectifier 144 which then provides DC power to DC operated solid state relays 146 which provides switched DC power to output terminal block 148. Switching is provided by block 150 that includes metal oxide varister 152, fuse 154, neon power indicator 156, step down power transformer 158, rectifier 160, voltage regulator 162, and oscillating control circuit 164 that controls the rate of polarity switching of DC operated solid state relays 146. Master power cutoff relay 166 is used for shutting down power if sensor 112 (FIG. 1a and FIG. 2) does not sense elevated temperature from burner 100 or otherwise does not sense flow of hydrogen. Switching power supply 41 is particularly useful for generating hydrogen and oxygen in core 20.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A method of dissociating or heating water comprising the steps of:
   (a) providing a reaction vessel having water therein;
   (b) providing a two dimensional matrix of rod shaped electrodes in said water in said reaction vessel, said matrix of rod shaped electrodes comprising first electrodes and second electrodes, said matrix comprising a smallest two dimensional repeating group that consists of four electrodes arranged clockwise in order: first electrode, second electrode, first electrode, second electrode, wherein said two dimensional matrix includes a plurality of said smallest two dimensional repeating groups; and
   (c) connecting a power supply to provide a potential difference between said first electrodes and said second electrodes.

2. The method as recited in claim 1, wherein heated water is circulated out of the reaction vessel.

3. The method as recited in claim 2, wherein said power supply comprises an AC source.

4. The method as recited in claim 1, wherein said plurality of smallest two dimensional repeating groups comprise an integrated structure.

5. The method as recited in claim 1, wherein distance between a first electrode of each said smallest repeating group and its nearest first electrode neighbor is greater than distance between said first electrode and its nearest second electrode neighbor.

6. The method as recited in claim 1, wherein distance between a first electrode of said two-dimensional matrix and its nearest first electrode neighbor is greater than distance between said first electrode and any one of four nearest second electrodes.

7. The method as recited in claim 1, wherein said four electrodes are arranged in a rectangle.

8. The method as recited in claim 7, wherein said rectangle is square.

9. The method as recited in claim 1, further comprising a top conductive plate and a bottom conductive plate, wherein said first electrodes of said plurality of repeating groups electrically and mechanically contact said top conductive plate and extend down from said top plate, and wherein said second electrodes of said plurality of repeating groups electrically and mechanically contact said bottom conductive plate and extend up from said bottom plate.

10. The method as recited in claim 9, further wherein said matrix comprises rows and columns, wherein electrodes extending from said top plate alternate with electrodes extending from said bottom plate along said rows and along said columns.

11. The method as recited in claim 10, further comprising an extension electrically contacting said top plate and extending from said top plate to a location below said bottom plate, wherein said extension is for making electrical contact to said top plate.

12. The method as recited in claim 11, wherein said top and said bottom plates further comprise holes.

13. The method as recited in claim 11, wherein said rod shaped electrodes are completely submersed in water during operation of the device.

14. The method as recited in claim 1, wherein said source of electrical power comprises at least one from the group including a DC power supply, a switching DC power supply, and an AC power supply.

15. The method as recited in claim 1, wherein said source of electrical power comprises a solar power supply.

16. The method as recited in claim 1, wherein said rod shaped electrodes comprise nickel or stainless steel.

17. The method as recited in claim 1, further comprising providing a water containing fluid between said electrodes.

18. The method as recited in claim 17, further comprising heating the water.

19. The method as recited in claim 18, further comprising providing an apparatus for using water heated by the device.

20. The method as recited in claim 19, wherein said apparatus for using water heated by the device comprises a heat exchanger.

21. A method as recited in claim 1, wherein said first and second electrodes have a common electrode dimension and a common electrode spacing wherein said common electrode dimension is equal to or less than about $1/8$ inch and wherein said common electrode spacing is equal to or less than about $1/16$ inch.

* * * * *

UNITED STATES PATENT AND TRADEMARK OFFICE
CERTIFICATE OF CORRECTION

PATENT NO. : 7,171,111 B2  
APPLICATION NO. : 10/328901  
DATED : January 30, 2007  
INVENTOR(S) : Carlton Sheldon Page 1 of 1

It is certified that error appears in the above-identified patent and that said Letters Patent is hereby corrected as shown below:

Column 4
Line 45, delete "de" and insert --dc--

Column 5
Line 2, delete "Value" and insert --Valve--

Signed and Sealed this

Twenty-seventh Day of March, 2007

JON W. DUDAS
*Director of the United States Patent and Trademark Office*